United States Patent [19]

Hutchison

[11] 4,298,108

[45] Nov. 3, 1981

[54] BRAKE-CLUTCH INTERLOCK

[75] Inventor: Wayne R. Hutchison, Mayville, Wis.

[73] Assignee: Deere & Company, Moline, Ill.

[21] Appl. No.: 83,040

[22] Filed: Oct. 9, 1979

[51] Int. Cl.³ .................. F16D 67/02; B60K 41/24
[52] U.S. Cl. .................................. 192/13 R; 74/477; 74/483 R
[58] Field of Search ............... 192/12 R, 13 R, 13 A, 192/14, 4 R, 111 A; 74/480 R, 483 R, 5, 9, 471 R, 478, 478.5, 477; 188/79.5 R, 79.5 GC, 79.5 K, 79.5 S, 79.5 SS, 196 R, 71.8; 56/11.3

[56] References Cited

U.S. PATENT DOCUMENTS

| | | | |
|---|---|---|---|
| 2,075,535 | 3/1937 | Miers | 192/13 R |
| 3,063,528 | 11/1962 | Wood | 192/13 R |
| 3,780,839 | 12/1973 | Schroeder | 192/4 A |
| 3,858,695 | 1/1975 | Whisler | 192/4 A |
| 4,037,675 | 7/1977 | Storace | 177/229 |
| 4,037,695 | 7/1977 | Welck | 192/13 R |

FOREIGN PATENT DOCUMENTS 679593  4/1930  France .............................. 192/13 R

OTHER PUBLICATIONS

France–Manuel d'Atelier, SM 3040, Tracteurs 110.112 (N de Serie 100,001–), (Nov. 69).

Primary Examiner—George H. Krizmanich

[57] ABSTRACT

The brake-clutch interlock includes a latch having a groove sized to receive a plurality of pins co-linerally aligned within the groove. The groove is shaped such that the latch cannot receive nor release either pin singularly. One of the pins is in linked communication with the vehicle clutch actuating means. The other pin is in linked communication with the vehicle parking brake actuating means. When both pins are properly aligned to be locked in place by the latch, the vehicle clutch is disengaged and the vehicle parking brake is engaged. The latch restrains the pins in such a manner that neither pin can be singularly released.

4 Claims, 2 Drawing Figures

BRAKE-CLUTCH INTERLOCK

BACKGROUND OF THE INVENTION

This invention relates to mechanical interlocks and more particularly, to a mechanical interlock for interrelating the functions of a vehicle clutch actuating mechanism and a vehicle brake actuating mechanism.

A continuing problem in the vehicle field has been the operator who sets a brake and thereafter, forgetting that he has done so puts the vehicle in motion. This difficulty is acute in vehicles with parking or transmission brakes where the vehicle's power plant has sufficient power or is geared low enough to operate against the resistant force of the brake without preceptible difficulty. This has always caused problems of brake wear, additionally in the case of a vehicle such as a tractor, an unreleased brake can become so hot as to create a fire hazard in the field.

The present invention describes a brake-clutch interlock mechanism which will not allow the carrying vehicle to be motivated unless the parking or transmission brake is released.

SUMMARY OF THE INVENTION

A clutch arm leading from the vehicle clutch pedal has a cross bar fixably mounted thereto. Mounted to the cross bar is a clutch linking arm whereto a first pin is mounted. A clutch linkage assembly is in communication with the clutch link arm to facilitate the engagement or disengagement of the vehicle clutch assembly. A brake arm leading from the vehicle's brake pedal is rotatably mounted on the cross bar and has fixably mounted thereto a brake linking member. A second pin is mounted to the brake linking member. A brake linkage assembly is in communication with the brake linking member to facilitate the engagement and disengagement of the vehicle parking brake assembly.

The first pin and second pin placed in co-linear alignment with both the clutch and brake arms are in a depressed position to allow a latch to receive both pins, locking them in place. The latch is placed relative to the pins to require the vehicle parking or transmission brake to be released in order to engage the vehicle clutch to motivate the vehicle. The brake linkage assembly attached to the brake linking member includes a means for compensating for brake wear.

It is an objective of this invention to provide means for interlocked the clutch and brake control mechanism of a vehicle in such a manner that the vehicle cannot be set in motion by the vehicle power source unless the vehicle parking or transmission brake has been released.

DETAILED DESCRIPTION OF THE PREFERRED EMBODIMENT

Figure 1:
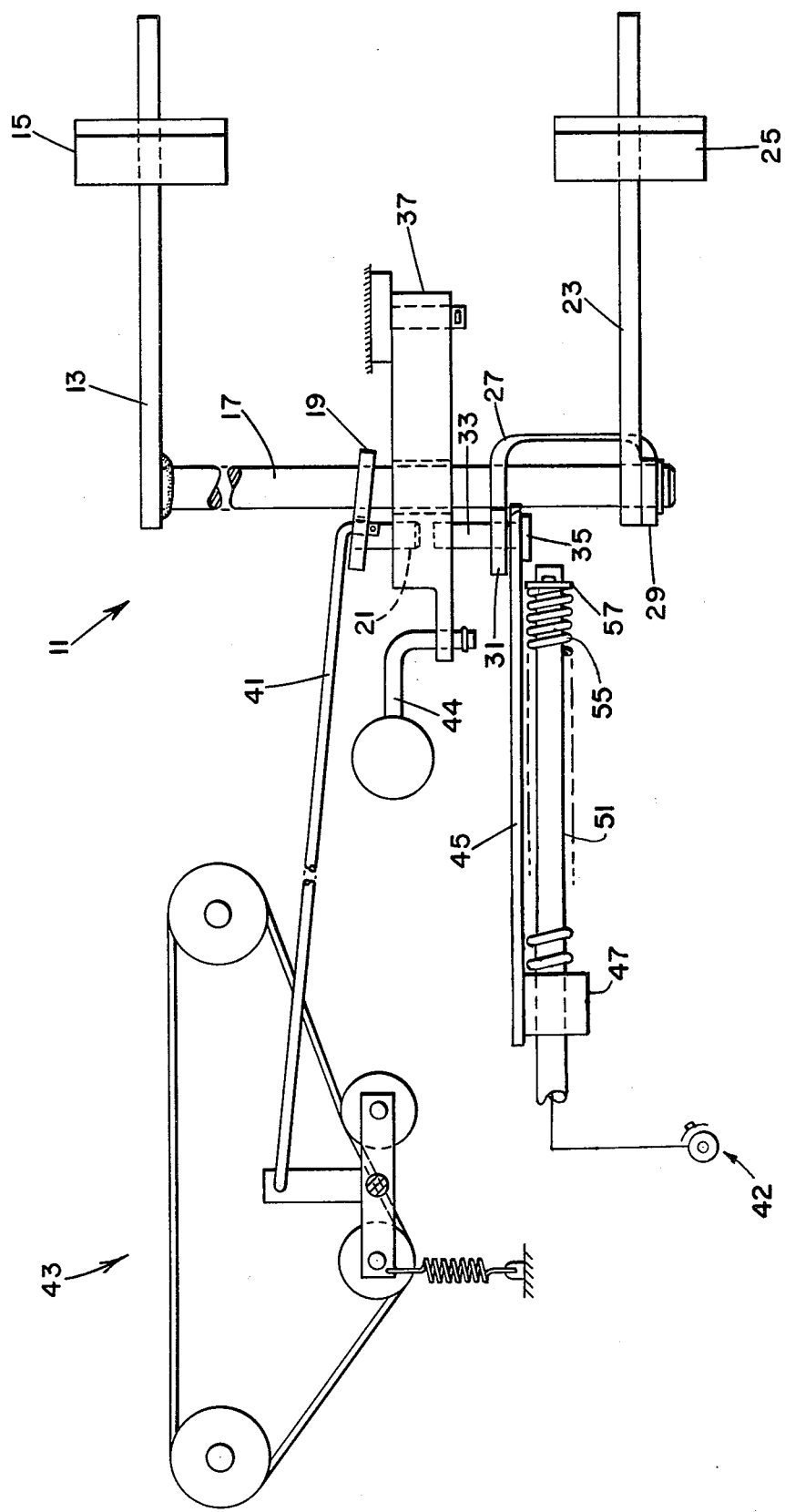
FIG. 1 shows a plan view of the brake-clutch interlock mechanism.

Referring to FIG. 1, the brake-clutch interlock system, generally indicated as 11, includes a clutch arm 13 extending from a pedal 15 having a crossbar 17 fixably mounted to the other end of the clutch arm 13 and extending generally perpendicular therefrom. A linking arm 19 is fixably mounted by any suitable means such as welding to and extends generally perpendicular from the crossbar 17. The linking arm 19 has a pin 21 fixably mounted by any conventional means to and extending generally perpendicularly from the linking arm 19. A brake arm 23 extending from a brake pedal 25 is rotatably mounted by any conventional means to the other end of the crossbar 17 and has a fixably mounted by any conventional means thereto a U-shaped member 27. The U-shaped member 27 is mounted to brake arm 23 such that an arm 29 of member 27 fixably is mounted to brake arm 23. The crossbar 17 passes through arm 29 and a second arm 31 of member 27. A pin 33 having a head 35 is passed through one end of a linking member 45 and arm 31 of member 27 such that a portion of linking member 45 is between arm 31 and the pin head 35. The pin 33 is fixably mounted to arm 31 by any conventional means to rotatably support member 45.

Figure 2:
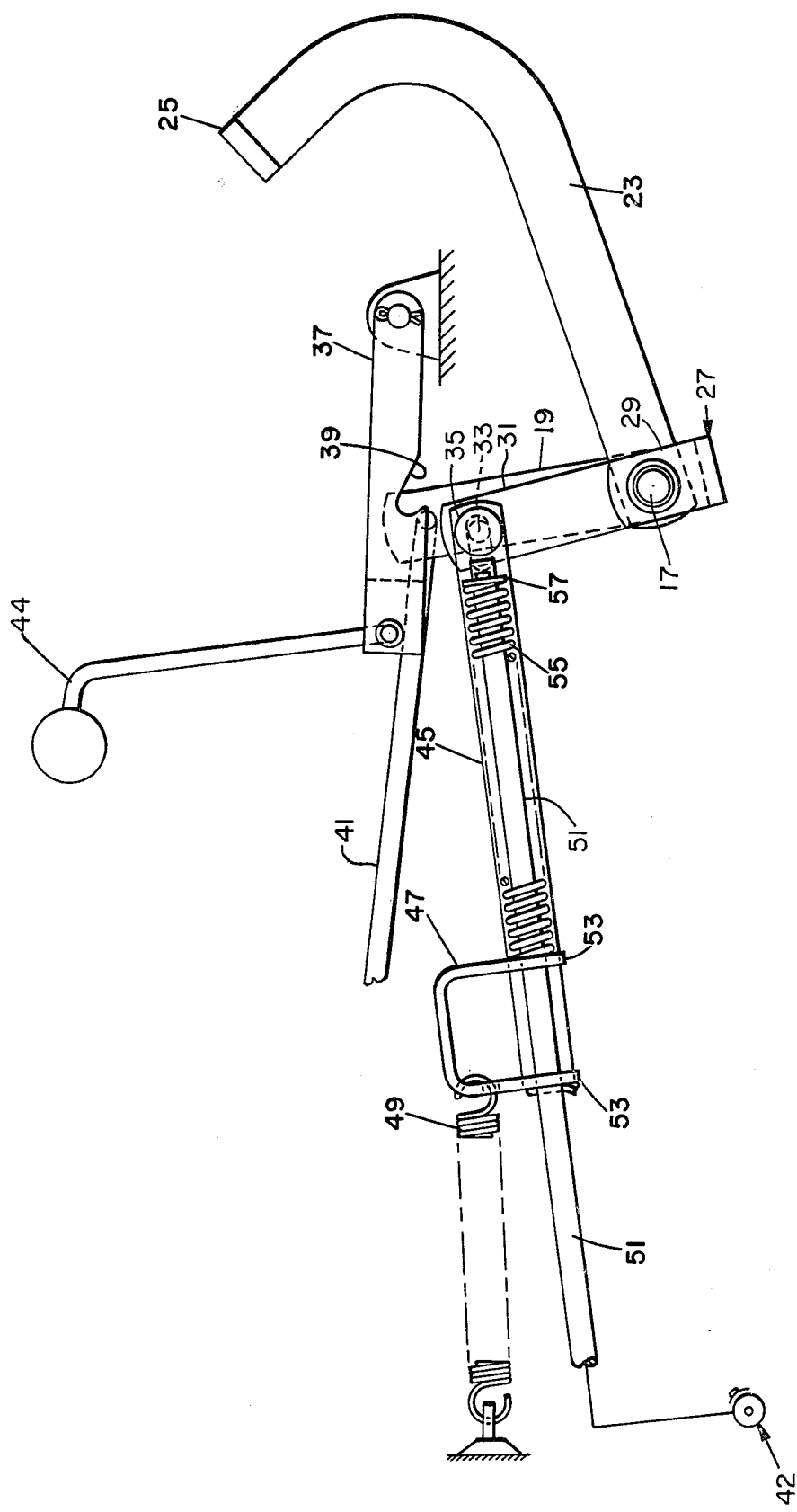
FIG. 2 shws a side view of the brake-clutch interlock mechanism.

Referring more particularly to FIGS. 1 and 2, and a latch arm 37 is rotatably mounting to a carrying vehicle frame (not shown) and has a groove 39 extending transverse within latch arm 37 and having a contour such that the latch 37 can drop over and lockably engage pins 21 and 33 only when pins 21 and 33 are in colinear alignment with one another. This is so, because the seep path of pins 21 and 35 as controlled by the respective motion of pedals 15 and 25 will block the motion of lever 37 to engage either pins 21 or 35 until both pedals 15 and 25 are depressed to colinearly align pins 21 to 35; thereby causing the clutch generally indicated as 43 to be disengaged and parking braking system generally indicated as 44 to be engaged.

A clutch-linkage arm 41 directly communicates with linking arm 19 such that depression of clutch pedal 15 will disengage a clutching assembly 43 (refer to FIG. 1). Depression of brake pedal 25 will cause engagement of vehicle parking brake assembly, schematically shown as 42. A handle 44 is fixably mounted by any conventional means to the end of latch 37 to facilitate rotation of latch 37.

Referring to FIG. 1, in order to compensate wear of the vehicle parking brake, the elongated member 45 is fixably mounted to its other end by any conventional means member 47. A rod 51 is passed through member 47 such that a portion of rod 51 is parallel to member 47. A spring 55 is placed around the portion of rod 51 parallel to member 45, and between member 47 and a carter clip 57 fixably mounted to one end of rod 51 placing spring 55 in compression. The other end of rod 51 communicated with a conventional braking assembly 44. Therefore, any resulting brake wear will be compensated for to allow pins 21 and 33 to remain in proper alignment. It is observed that brake wear will increase the necessary travel distance of rod 51 for full application of the vehicle brakes 42. Therefore, when pin 35 is restrained by latch 37 and brake wear has occurred, spring 55 acting on clip 57 will compensate for additionally required travel distance of rod 51.

I claim:

1. A vehicle brake-clutch interlock mechanism comprising;
    (a) a clutch arm;
    (b) a crossbar fixably mounted to one end of said clutch arm;
    (c) a clutch linking arm fixably mounted to said crossbar and extending generally perpendicular therefrom;
    (d) first means for communicating said linking arm to said vehicle's clutch such that rotation of said clutch arm will cause said vehicle's clutch to disengage;
(e) first locking pin fixably mounted to said clutch linking arm and extending generally perpendicular therefrom;
(f) a brake arm rotatably mounted to said crossbar;
(g) a brake linking member fixably mounted to said brake arm and rotatable with said brake arm with respect to said crossbar;
(h) second locking pin fixably mounted to said brake linking member;
(i) second means for communicating said linking member to said vehicle brake such that rotation of said brake arm causes engagement of said vehicle's brakes;
(j) interlocking means for restrainable engagement of said first and second locking pins such that said vehicle's brake is engaged and said vehicle's clutch assembly is disengaged, said interlocking means cannot singularly engage or disengage said first and second locking pins.

2. A vehicle brake-clutch interlock mechanism as claimed in claim 1 where said interlock means is comprised of a latch having a grooved contoured therein to receive said first and second pins, said latch positioned relative to the seep path of said pins such that said groove cannot be singularly engaged to either said pins.

3. An apparatus as claimed in claim 1 further comprising brake compensation means.

4. An apparatus as claimed in claim 3 wherein said brake compensating means comprises:
(a) a first member having a generally elongated configuration rotatably mounted to said second locking pin;
(b) a second member fixably mounted to said first member;
(c) a rod extending through said second member and communicating with said vehicle's brake;
(d) a spring placed around said rod abutting said second member;
(e) restraining means fixably mounted to said rod such that said spring is placed in compression between said second member and said restraining means; and
(f) a return spring fixably mounted to said second member and said vehicle structure.

* * * * *